US011725551B2

(12) United States Patent
Jainek

(10) Patent No.: US 11,725,551 B2
(45) Date of Patent: Aug. 15, 2023

(54) FILTER ELEMENT OF A FILTER FOR PURIFYING FLUIDS, INSERTION ADAPTER, AND FILTER

(71) Applicant: MANN+HUMMEL GmbH, Ludwigsburg (DE)

(72) Inventor: Herbert Jainek, Heilbronn (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 372 days.

(21) Appl. No.: 16/892,664

(22) Filed: Jun. 4, 2020

(65) Prior Publication Data

US 2020/0386129 A1 Dec. 10, 2020

(30) Foreign Application Priority Data

Jun. 7, 2019 (DE) .................. 102019115547.9

(51) Int. Cl.
*B01D 29/21* (2006.01)
*F01M 11/03* (2006.01)
*B01D 35/153* (2006.01)

(52) U.S. Cl.
CPC ............ *F01M 11/03* (2013.01); *B01D 29/21* (2013.01); *B01D 35/153* (2013.01); *B01D 2201/295* (2013.01); *B01D 2201/4084* (2013.01)

(58) Field of Classification Search
CPC ...... F01M 11/03; B01D 29/21; B01D 35/153; B01D 2201/295; B01D 2201/4084; B01D 35/306; B01D 2201/291; B01D 35/147; B01D 29/01; B01D 29/0002; B01D 29/0095; B01D 29/31; B01D 29/96; B01D 2201/36; F16N 2039/065; F16N 39/06

See application file for complete search history.

(56) References Cited

FOREIGN PATENT DOCUMENTS

| DE | 102015108594 A1 | 12/2016 |
| DE | 102015008328 A1 | 1/2017 |
| DE | 102016124587 A1 * | 6/2018 |
| DE | 102016124587 A1 | 6/2018 |
| DE | 102017011523 A1 | 6/2019 |

* cited by examiner

*Primary Examiner* — Waqaas Ali

(57) ABSTRACT

A filter element arranged exchangeably in a filter housing of a filter has a filter medium delimiting an element interior. An end body arranged at the filter medium has a fastening region surrounding the interior opening that communicates with the element interior. An insertion adapter for connecting the filter element to a fluid connector of the filter housing has an insertion sleeve insertable axially into the fastening region of the end body. The inward side of the fastening region is provided with a material that is initially flexible during manufacture of the filter element and hardens later on. The insertion sleeve has a holding element radially outwardly arranged at the circumference. With inserted insertion sleeve, the holding element is arranged in the fastening region. The initially flexible material of the fastening region flows behind the holding element and forms a form fit connection with the holding element when hardened.

10 Claims, 3 Drawing Sheets

FILTER ELEMENT OF A FILTER FOR PURIFYING FLUIDS, INSERTION ADAPTER, AND FILTER

BACKGROUND OF THE INVENTION

The invention concerns a filter element for a filter for purifying fluids which can be exchangeably arranged in a filter housing of the filter. Moreover, the invention concerns an insertion adapter for connecting a filter element to a fluid connector in the interior of a filter housing of a filter for purifying fluids.

EP 2 412 417 B1 discloses a filter for motor oil of an oil circuit of an internal combustion engine of a motor vehicle. The filter comprises a filter housing in which an exchangeable filter element is located. The filter element is made of zigzag-shaped folded filter medium which, at its end faces, is glue-connected to an annular film end disc, respectively. The openings of the film end disc and of a support disc are part of a connecting opening to an interior of the filter medium. A connector tube piece of a connector part projects through the connecting opening into the interior of the filter medium. A connecting tube section comprises at its radially outer circumferential side a circumferential bead. The outer diameter of the bead is larger than the diameter of the connecting opening in the region of the film end disc. The initially soft and deformable film end disc is elastic so that the bead can be pushed against a mechanical resistance across the radial inner rim of the film end disc. After passing the film end disc, the bead is resting with form fit against the radially inner fold edges of the filter medium under a pretension acting in radial direction.

SUMMARY OF THE INVENTION

The invention has the object to configure a filter element, an insertion adapter, and a filter of the aforementioned kind in which axial clearance, with respect to the connecting axis, between the insertion adapter and the at least one end body can be reduced, in particular upon removal of the filter element from the filter housing.

This object is solved according to the invention for the filter element in that the at least one holding element in its end position is arranged within the at least one fastening region, wherein the initially flexible material of the at least one fastening region flows behind the at least one holding element and the hardened material of the at least one fastening region forms a form fit connection with the at least one holding element.

The invention concerns a filter element for a filter for purifying fluids which can be exchangeably arranged in a filter housing of the filter, which may have:
- at least one element interior which is delimited by a filter medium such that fluid for purification can flow through the at least one filter medium,
- at least one interior opening communicating with the at least one element interior,
- at least one end body which is arranged at the filter medium such that it surrounds the at least one interior opening relative to a virtual connecting axis,
- at least one insertion adapter for connecting the filter element to a fluid connector provided at the filter housing, wherein the at least one insertion adapter comprises a hollow insertion sleeve which can be inserted axially with respect to the virtual connecting axis into the fastening region of the at least one end body, wherein the fastening region surrounds circumferentially the at least one interior opening and the connecting axis, wherein the material of the at least one fastening region on a side which is facing the interior opening is flexible when manufacturing the filter element and hardens later on, and wherein the insertion sleeve comprises at least one holding element at its radially outer circumferential side with respect to the connecting axis.

Moreover, the invention concerns an insertion adapter for connecting a filter element to a fluid connector in the interior of a filter housing of a filter for purifying fluids, wherein the at least one insertion adapter comprises at least one hollow insertion sleeve which can be inserted axially with respect to a virtual connecting axis into a fastening region of an end body of the filter element, wherein the at least one fastening region surrounds circumferentially an interior opening communicating with an element interior of the filter element and the connecting axis.

Also, the invention concerns a filter for purifying fluids, having:
- an openable filter housing which comprises at least one fluid inlet for a fluid to be purified and at least one fluid outlet for purified fluid,
- and at least one filter element which is arranged or can be arranged exchangeably in the at least one filter housing such that it separates the at least one fluid inlet from the at least one fluid outlet.

According to the invention, at least one holding is provided element at the insertion adapter which, when the insertion adapter is installed, is located within the fastening region of the at least one end body of the filter element. The material of the at least one fastening region is initially flexible when manufacturing the filter element so that the at least one holding element can be easily inserted. The initially flexible material of the at least one fastening region flows behind the at least one holding element. Over time and/or by contact with the fluid, the flexibility of the material of the at least one fastening region decreases, it hardens. In this way, in the end position of the at least one insertion adapter a form fit connection between the at least one fastening region and the at least one holding element is formed. This form fit connection is axially stable with respect to the connecting axis and without axial clearance. In contrast thereto, in the filter known from the prior art the bead does not engage the film end disc but a radially inner folding edge of the filter medium. According to the invention, it is prevented that, when pulling out the filter element from the filter housing, the insertion adapter is moved in the axial direction inside the fastening region due to possible bonding or cementing of the insertion adapter with the filter housing. The insertion adapter can be directly pulled out together with the remaining filter element from the filter housing without delay. In this way, possible functions in which the insertion adapter is participating, in particular a drainage control of a fluid drain of the filter housing, can be actuated directly and without delay.

The filter element can be advantageously a so-called round filter element with a round cross section, an oval round filter element with an oval cross section, a flat-oval round filter element with a flattened oval cross section, a conical round filter element in which the round cross section tapers in axial direction toward a main axis, a conical oval round filter element in which the oval cross section in axial direction tapers at least in the direction of a transverse axis, a conical flat-oval round filter element in which the flat-oval cross section in the axial direction tapers at least in the direction of a transverse axis, or a hollow filter element with a different type, in particular a square, cross section and/or a different type of axial cross-sectional course in the direction of an element axis.

The filter medium can advantageously be circumferentially continuous or open with respect to the connecting axis. The filter medium can be in particular folded in a star shape, preferably zigzag-shaped or corrugated, or be curved. The filter medium can also not be folded or not be curved.

The filter element can advantageously be part of a motor oil filter of an internal combustion engine. The motor oil filter can advantageously be part of a motor oil circuit of an internal combustion engine. It can serve for purifying motor oil which is supplied to the internal combustion engine. The invention is however not limited to a motor oil filter of a motor oil circuit of an internal combustion engine. Instead, it can also be used in different types of liquid systems, in particular fuel systems, hydraulic systems, cooling systems, or fluid systems with urea-water solution, for purifying respective fluids.

The invention can be used in motor vehicles, in particular passenger cars, trucks, buses, agricultural and/or construction vehicles, construction/agricultural machines, compressors, industrial motors or other devices in particular with internal combustion engines. The invention can be used for land vehicles, water vehicles, and/or aircraft.

In an advantageous embodiment, at least one holding element can comprise or be comprised of at least one raised portion and/or at least one holding element can comprise or be comprised of at least one depression. Raised portions and depressions can be realized in a simple way at the outer circumference of the insertion sleeve.

Raised portions can produce corresponding complementary depressions at the fastening region. Depressions can generate corresponding raised portions at the fastening region.

An insertion sleeve can comprise only raised portions or only depressions or depressions as well as raised portions. In this way, the form fit connection can be realized more flexibly.

In a further advantageous embodiment, at least one holding element can extend at the outer circumference of the insertion sleeve circumferentially continuously and/or at least one holding element can extend at the outer circumference of the insertion sleeve circumferentially interrupted. By means of a circumferentially continuous holding element, a uniform force distribution along the outer circumference of the at least one holding element can be achieved. With corresponding interruptions, the initially flexible material of the fastening region can yield upon insertion of the insertion sleeve into the fastening region. In this way, a force expenditure upon insertion of the at least one holding element into the fastening region can be reduced.

In a further advantageous embodiment, a plurality of holding elements can be arranged in distribution about the outer circumference of the insertion sleeve. In this way, gaps can be realized between the holding elements. By means of the gaps, the initially flexible material of the fastening region can yield upon insertion of the insertion sleeve into the fastening region. In this way, a force expenditure upon insertion of the at least one holding element into the fastening region can be reduced.

Advantageously, a plurality of identical holding elements and/or a plurality of different holding elements can be arranged at the outer circumferential side of the insertion sleeve. Identical holding elements can be realized easier. With different holding elements, a flexible configuration can be realized.

In a further advantageous embodiment, at least one insertion adapter can comprise at least one locking element which engages behind at least one fastening region at the side facing at least one element interior. In this way, in addition to the at least one holding element a locking element can be provided which is arranged outside of the at least one fastening region. With the at least one locking element an additional securing action can be realized. In this way, the risk can be reduced that the insertion adapter is pulled out of the fastening region in case the form fit connection between the at least one holding element and the at least one fastening region is destroyed by a corresponding force introduction.

Advantageously, the at least one locking element can be configured as a raised portion. The at least one locking element can be realized to be circumferentially continuous or circumferentially interrupted.

Advantageously, the at least one locking element can comprise a ramp at its leading side in the insertion direction. In this way, upon insertion of the insertion sleeve, the at least one fastening region can be guided outwardly.

Advantageously, the at least one locking element can comprise a locking step at its trailing side in the insertion direction. The at least one locking element can thus lock behind the at least one fastening region.

In a further advantageous embodiment, at least one insertion adapter can comprise or carry at least one functional component. With the at least one functional component, an additional function can be fulfilled.

Advantageously, at least one functional component can comprise or be comprised of at least one fluid drain closure element. With the fluid drain closure element, a corresponding fluid drain of the filter housing can be automatically closed when the filter element is installed. In this way, it can be prevented that fluid from the housing interior of the filter housing can accidentally drain through the fluid drain. Upon removal of the filter element, the at least one fluid drain closure element can be automatically separated from the fluid drain and release the latter. Due to the form fit connection according to the invention between the at least one holding element and at least one fastening region, the at least one fluid drain closure element can be removed directly without axial clearance and delay together with the filter element. The fluid contained in the fluid housing can drain in this way through the fluid drain. In this way, it can be prevented that upon removal of the filter element fluid can flow accidentally from the filter housing into the environment. The fluid drain closure element can be designed in the shape of a bell which covers in the sealing position the fluid drain in axial direction. Alternatively, the fluid drain closure element can comprise a different shape, for example, the fluid drain closure element can be in the shape of a flat disc.

In a further advantageous embodiment, at least one insertion adapter can comprise at least one adapter-associated positioning element outside of the at least one element interior which interacts with a corresponding housing-associated positioning element provided at the filter housing of the filter. With the at least one adapter-associated positioning element, a rotational orientation of the at least one filter element in the filter housing can be predetermined. Accordingly, in particular in case that the at least one insertion adapter comprises a further functional component, in particular a fluid drain closure element or the like, it can be ensured that the functional component is arranged at the correct position in the filter housing. A corresponding fluid drain closure element can thus be joined with the fluid drain more precisely in order to close the latter.

Advantageously, at least one adapter-associated positioning element can be realized as a recess, in particular as a slot or gap. The at least one adapter-associated positioning element can be realized in a circumferential side that is radially outward with respect to the connecting axis in particular of a connecting tube section of the insertion adapter. Correspondingly, a corresponding housing-associated positioning element in the form of a corresponding raised portion, in particular a projection, stay, pin or the like, can be arranged at the filter housing. In correct installation position of the filter element, the housing-associated positioning element can engage the adapter-associated positioning element.

Alternatively or additionally, the at least one adapter-associated positioning element can comprise at least one raised portion which can engage at least one housing-associated positioning element in the form of a corresponding recess or gap.

Advantageously, the insertion adapter can also comprise a plurality of adapter-associated positioning elements. Alternatively or additionally, the housing can comprise a plurality of housing-associated positioning elements.

Moreover, the object is solved according to the invention for the insertion adapter in that the at least one holding element in its end position is arranged within the at least one fastening region, wherein the initially flexible material of the at least one fastening region flows behind the at least one holding element and the hardened material of the at least one fastening region forms a form fit connection with the at least one holding element.

In addition, the object is solved according to the invention for the filter in that the filter comprises at least one filter element according to the invention.

In an advantageous embodiment, the filter housing can comprise at least one fluid drain for draining fluid contained in the filter housing. In this way, in particular when exchanging the filter element, the fluid contained in the filter housing can drain.

In other respects, the features and advantages which have been discussed in connection with the filter element according to the invention, the insertion adapter according to the invention, and the filter according to the invention and their respective advantageous embodiments apply likewise among each other, and vice versa. The individual features and advantages can of course be combined with each other, whereby further expedient effects may result which surpasses the sum of the individual effects.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in combination in the drawing, the description, and the claims also expediently individually and combine them to further expedient combinations.

In the Figures, same components are provided with same reference characters.

DESCRIPTION OF PREFERRED EMBODIMENTS

Figure 1:
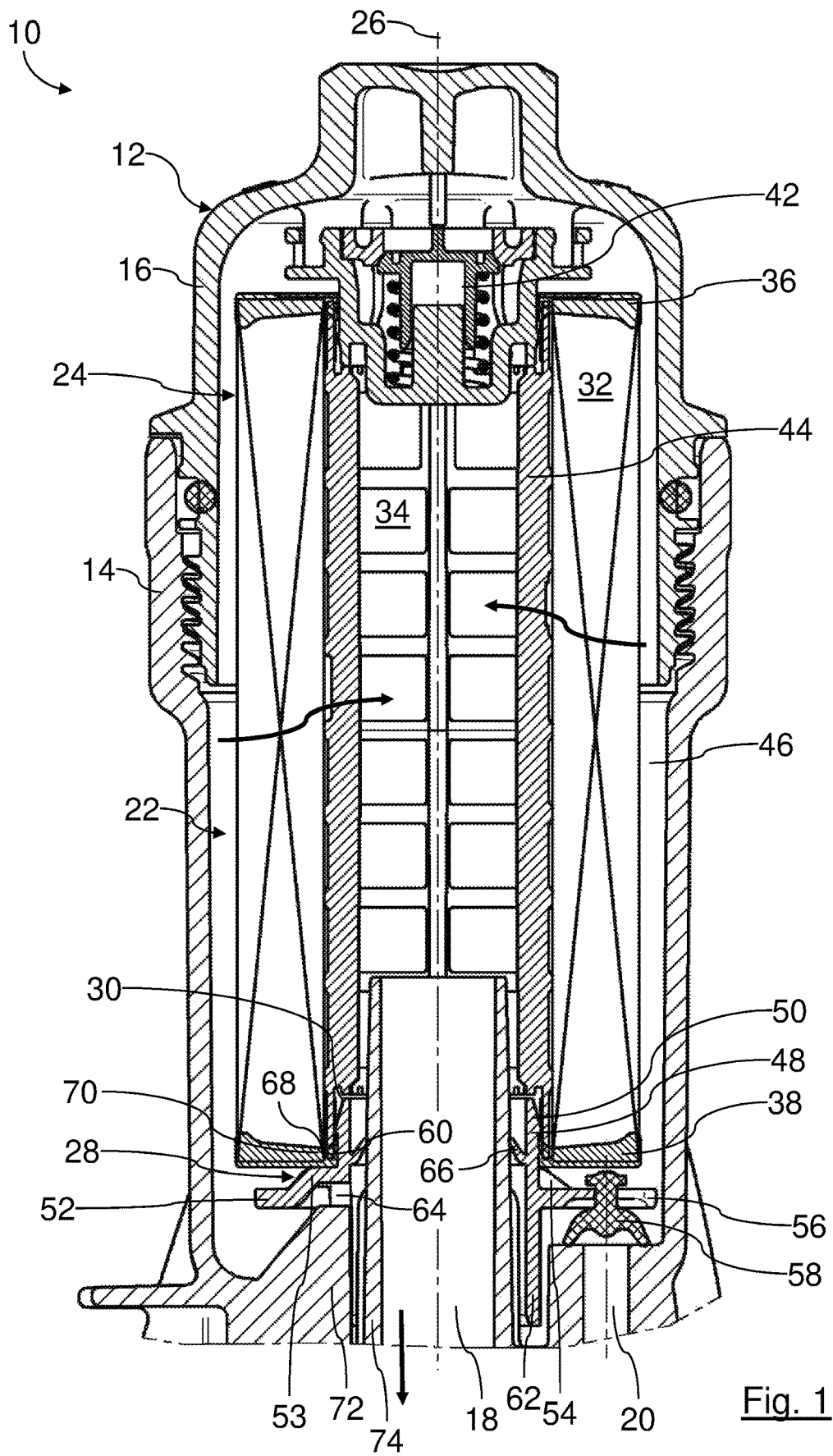
FIG. 1 shows a longitudinal section of a filter for fluid, with an openable filter housing in which a filter element with an insertion adapter is arranged exchangeably.
Figure 2:
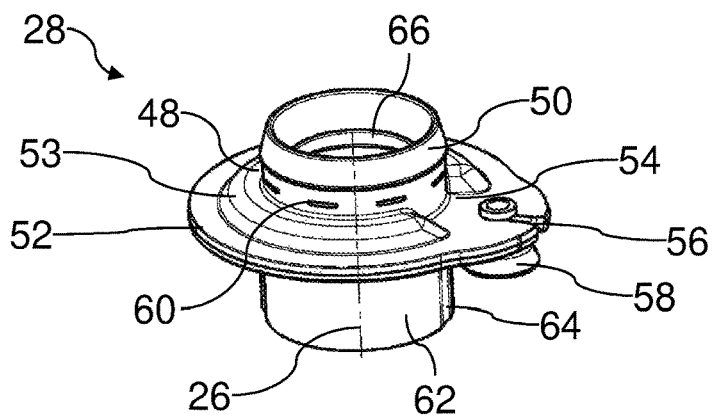
FIG. 2 shows an isometric illustration of an insertion adapter for the filter element of FIG. 1, according to a first embodiment.
Figure 3:
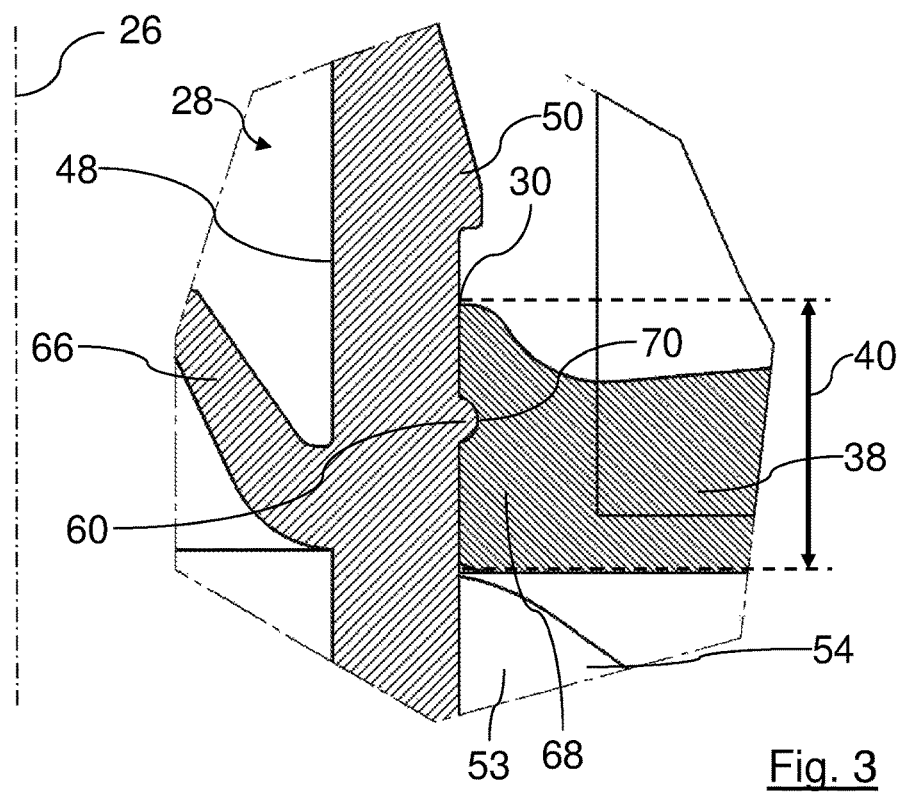
FIG. 3 shows a detail view of the filter element of FIG. 1 in the region of the insertion adapter.

In FIGS. 1 to 3, a filter 10 for fluid, for example, motor oil of an internal combustion engine of a motor vehicle, according to a first embodiment is illustrated in various perspective and detail views.

The filter 10 comprises a filter housing 12 with a filter cup 14 and a filter cover 16.

The filter housing 12 comprises a fluid inlet, which is hidden in FIG. 1 and therefore not illustrated, for fluid to be purified, a fluid outlet 18 for purified fluid, and a fluid drain 20 through which fluid can drain from the housing interior 22, for example, in case of servicing.

The filter cover 16 is screwed with a screw connection into the filter cup 14. The filter housing 12 can thus be opened and closed.

A filter element 24 is exchangeably arranged in the filter housing 12 such that it separates the fluid inlet from the fluid outlet 18. The filter element 24 is inserted axially along a virtual connecting axis 26 into the filter cup 14.

When in the following "radial", "coaxial", "axial", "circumferential" or the like is mentioned, this relates to, if nothing else is indicated, the connecting axis 26. In the illustrated embodiment, an installation axis of the filter element 24 into the filter cup 14, a screw axis of the filter cover 16 onto the filter cup 14, and an insertion axis of an insertion adapter 28, explained in the following in more detail, into an interior opening 30 of the filter element 24 are coaxial to the connecting axis 26, for example. The installation axis, the screw axis, and the insertion axis are referred to also as "connecting axis 26" in the following for better clarity.

The filter element 24 is embodied as a so-called round filter element in an exemplary fashion. The filter element 24 comprises a filter medium 32 which continuously surrounds the connecting axis 26 circumferentially. The filter medium 32 delimits an element interior 34 in radial direction outwardly.

At the axial end faces, the filter medium 32 is closed off respectively by an end body, for example, in the form of a cover-facing end disc 36 at the side which is facing the filter cover 16, and a cup-facing end disc 38 at the side which is facing the filter cup 14. The material of the end discs 36 and 38 penetrates respectively the filter medium 32 in axial direction.

The cup-facing end disc 38 is realized with a material, for example, plastic material or foam material, which is flexible initially, for example, when assembling the filter element 24. The material of the cup-facing end disc 38 loses later on its flexibility, for example, over time, by contact with the fluid, in particular oil and/or corresponding temperature. For example, the material of the cup-facing end disc 38 hardens.

The cup-facing end disc 38 extends with a radially inner fastening region 68 across an axial height 40 from the end face of the filter element 24 into the element interior 34.

The cup-facing end disc 38 comprises centrally the interior opening 32 communicating with the element interior 24.

For example, the interior opening 30 is coaxial to the connecting axis 26. The interior opening 30 is surrounded continuously by the fastening region 68.

A central opening of the cover-facing end disc 36 accommodates a bypass valve 42 which is not of interest in this context.

Between the end discs 36 and 38, a grid-type support tube 44 is provided in the element interior 34. The filter medium 32 is supported at the support tube 44 with its radial inner circumferential side. The circumferential wall of the support tube 44 is permeable for fluid.

The filter element 24 is surrounded in the housing interior 22 by a fluid inlet space 46. The fluid inlet space 46 is connected with the fluid inlet of the filter housing 12 for the fluid to be purified.

In FIG. 2, the insertion adapter 28 according to a first embodiment is illustrated.

The insertion adapter 28 comprises an insertion sleeve 48 in the form of a pipe socket which is hollow in the interior. With the insertion sleeve 48, the insertion adapter 28 is inserted axially into the interior opening 30.

The insertion sleeve 48 comprises at its free rim a locking element 50. The locking element 50 is realized at the radially outer circumferential side of the insertion sleeve 48 so as to be circumferentially continuous. The locking element 50 is realized as a ramp at the side which is facing the free rim. At the side which is axially facing away from the rim, the locking element 50 is provided with a step. The largest outer diameter in the region of the locking element 50 is greater than the smallest inner diameter of the cup-facing end disc 38 in the fastening region 68.

At the side which is axially oppositely positioned to the free rim, the insertion sleeve 48 passes into a disc section 52 of the insertion adapter 28 to provide a one-piece configuration. The disc section 52 extends circumferentially.

A partial circumferential bead 53 extends in axial direction about the disc section 52. The bead 53 surrounds the insertion sleeve 48 and adjoins directly the latter, viewed in radial direction. In the illustrated embodiment, the bead 53 comprises an interruption 54 at one side. Alternatively, the bead 53 can surround circumferentially closed the insertion sleeve 48.

Viewed circumferentially, a receptacle 56 for a fluid drain closure element 58 is realized in the disc section 52 at the level of the interruption 54. The receptacle 56 is open in radially outward direction. Alternatively, the fluid drain closure element 58 can be passed through a closed receptacle 56 through the disc section 52 or can be injection-molded to the disc section.

The fluid drain closure element 58 has the shape of a bell in the illustrated embodiment. The fluid drain closure element 58 comprises a holding section with which it is buttoned from a radially outward side into the receptacle 56. The fluid drain closure element 58 is made of an elastic material, for example, plastic material, rubber or the like.

Axially between the bead 53 and the locking element 50, a plurality of adapter-associated, for example, identical holding element 60 are arranged at the radially outer circumferential side of the insertion sleeve 48. The adapter-associated holding elements 60 have the form of web-shaped raised portions. The adapter-associated holding elements 60 extend at the same axial level in circumferential direction, respectively. The adapter-associated holding elements 60 are arranged at identical circumferential distances relative to each other.

At the side of the disc section 52 which is axially oppositely positioned relative to the insertion sleeve 48, the insertion adapter 28 comprises a connecting tube section 62. An interior of the insertion adapter 28 extends, for example, with a constant cross section axially from the insertion sleeve 48 to the connecting tube section 62 and serves in this way as a fluid connection. The connecting tube section 62 comprises at a circumferential side an adapter-associated positioning element 64. The adapter-associated positioning element 64 is realized as a gap in the circumferential wall of the connecting tube section 62. The gap is continuous in radial direction and open toward the free rim of the connecting tube section 62.

At the radially inner circumferential side of the insertion sleeve 48, a sealing lip 66 is arranged moreover. The sealing lip 66 extends continuously in circumferential direction. Viewed in axial direction, the sealing lip 66 is oriented away from the disc section 52 at a slant inwardly toward the free rim of the insertion sleeve 48.

For assembly of the filter element 24, the insertion adapter 28 is inserted with the insertion sleeve 48 leading into the interior opening 30 of the cup-facing end disc 38.

In doing so, the diamond-shaped side of the locking element 50 first expands the still flexible material of the fastening region 68 in radial direction outwardly. Upon further insertion, the holding elements 60 expand the material of the fastening region 68 in radial direction outwardly. Upon further insertion, the locking element 50 leaves the fastening region 68 and locks behind it. The end position of the insertion adapter 28 is reached as soon as the bead 53, as illustrated in FIGS. 1 and 3, meets the cup-facing end disc 38.

In the end position, the adapter-associated holding elements 60 are located in the fastening region 68. The still flexible material of the fastening region 68 flows behind the respective adapter-associated holding elements 60 so that in the fastening region 68 corresponding end disc-associated holding elements 70 are formed. The end disc-associated holding elements 70 are depressions complementary to the adapter-associated holding elements 60.

After hardening of the material of the fastening region 68, the adapter-associated holding elements 60 form a form fit connection with the respective end disc-associated holding elements 70, respectively. Hardening of the material of the fastening region 68 is realized over time and by action of the fluid and temperature. With the form fit connection, forces between the insertion adapter 28 and the cup-facing end disc 38 can be transmitted in axial direction without axial clearance.

For installation, the assembled filter element 24 is inserted with the insertion adapter 28 leading in axial direction through the opening of the open filter cup 14. In doing so, the connecting tube section 62 is pushed onto a fluid outlet socket 74 of the fluid outlet 18 which projects into the axial housing interior. The sealing lip 66 rests seal-tightly against the radially outer circumferential side of the fluid outlet socket 74 of the fluid outlet 18.

As an alternative for installation, the assembled filter element 24 with the insertion adapter 28 is first inserted into the filter cover 16 and, subsequently, the connecting tube section 62 is pushed onto a fluid outlet socket 74 of the fluid outlet 18 which projects into the axial housing interior.

Depending on the rotational orientation of the filter element 24 relative to the filter cup 14, it may be necessary to rotate the filter element 24 about the connecting axis 26 in order to bring together the adapter-associated positioning element 64 with the corresponding housing-associated positioning element 72. The housing-associated positioning element 72 is realized in the form of a stay which extends in axial direction.

In the correct rotational position of the filter element 24, the position of the fluid drain closure element 58 also coincides with the opening of the fluid drain 20. In this position, the fluid drain closure element 58 closes off the fluid drain 20 so that no fluid can drain from the filter housing 12.

Subsequently, the filter cover 16 is screwed on. The bypass valve 42 is fastened to the inner side of the filter cover 16. The bypass valve 42 when screwing on the filter cover 16 is automatically pushed through the corresponding opening of the cover-facing end disc 36 into the element interior 34.

For removing the filter element 24, the filter cover 16 is opened. Subsequently or together with the filter cover 16, the filter element 24 can be pulled in axial direction out of the filter cup 14. In this context, by means of the form fit connection between the adapter-associated holding elements 60 and the end disc-associated holding elements 70, it is ensured that the insertion adapter 28 can be pulled out together with the remaining filter element 24, even in case of operation-caused bonding of the insertion adapter 28 at the bottom of the filter cup 14, without the insertion adapter 28 moving in axial direction relative to the cup-facing end disc 38.

When pulling out the filter element 24, the fluid drain 20 is automatically released without delay by the fluid drain closure element 58 so that fluid that is contained in the housing interior 22 can drain through the fluid drain 20.

Figure 4:
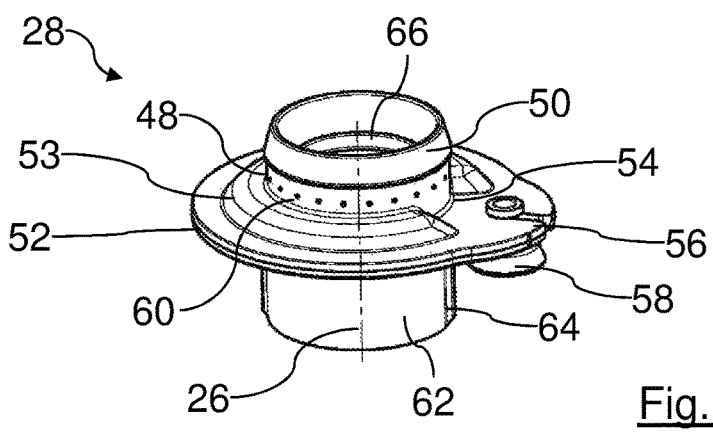
FIG. 4 shows an insertion adapter for the filter element of FIG. 1, according to a second embodiment.

In FIG. 4, an insertion adapter 28 according to a second embodiment is illustrated. In contrast to the first embodiment of FIG. 2, in the second embodiment the holding elements 60 are designed as knobs.

Figure 5:
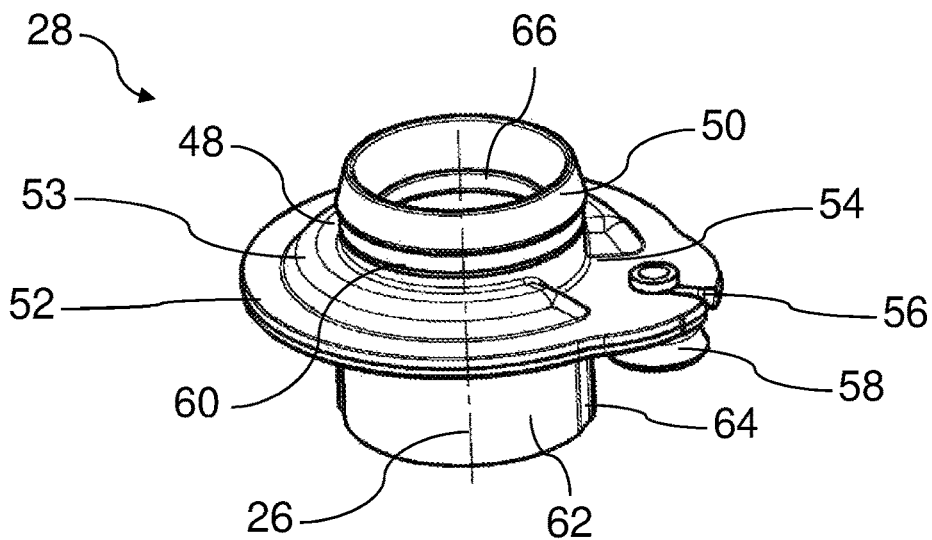
FIG. 5 shows an insertion adapter for the filter element of FIG. 1 according to a third embodiment.

In FIG. 5, an insertion adapter 28 according to a third embodiment is illustrated. In contrast to the first embodiment of FIG. 2 and the second embodiment of FIG. 4, in the third embodiment only one holding element 60 is provided which extends circumferentially continuously as a web at the radially outer circumferential side of the insertion sleeve 48.

Figure 6:
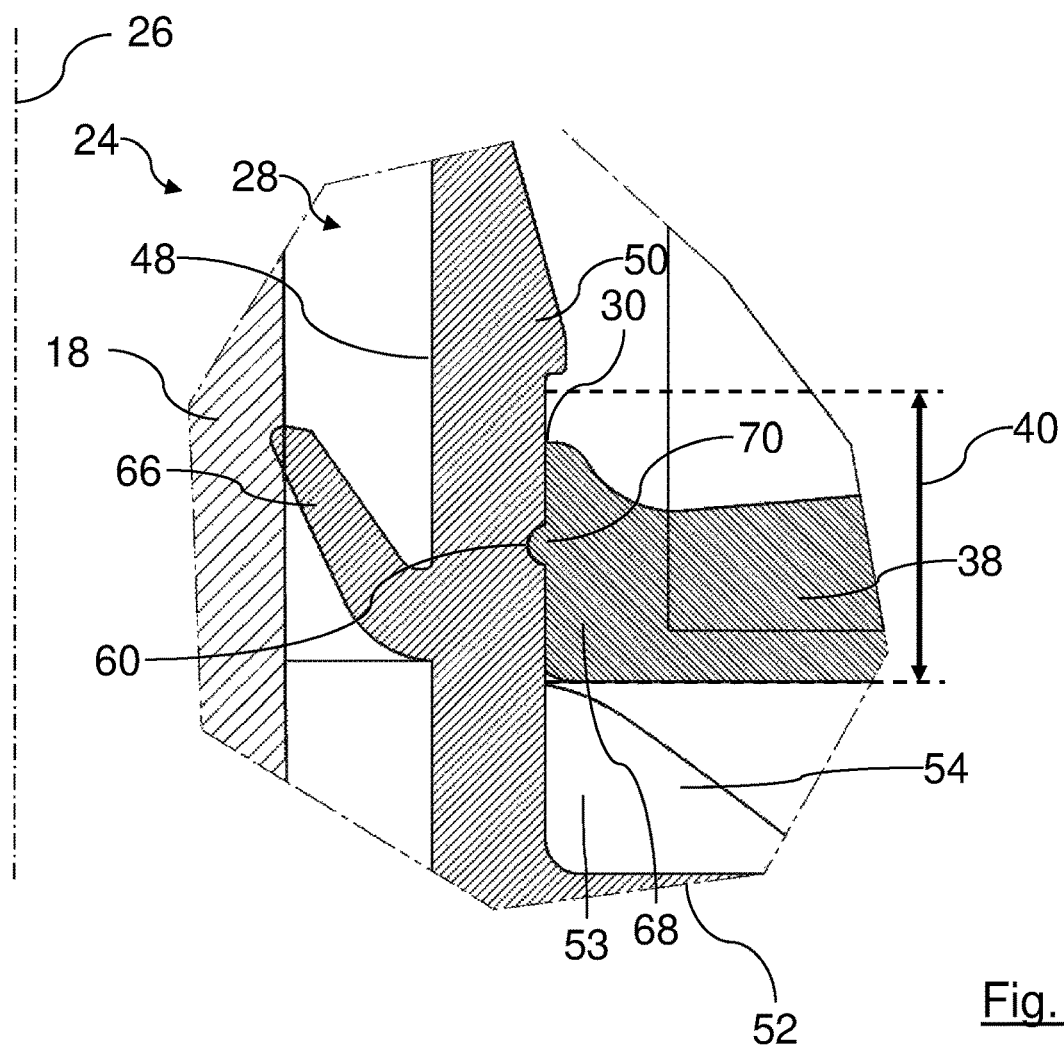
FIG. 6 shows a detail view of a filter element with an insertion adapter according to a fourth embodiment.

In FIG. 6, a filter element 24 with an insertion adapter 28 according to a fourth embodiment is illustrated in a detail section view. In contrast to the three first embodiments of FIGS. 2, 4, and 5, in the fourth embodiment the holding element(s) 60 are designed as a depression in the radially outer circumferential wall of the insertion sleeve 48 instead of as a raised portion. Correspondingly, the end disc-associated holding elements 70 are realized as raised portions which are complementary to the corresponding adapter-associated holding elements 60.

What is claimed is:

1. A filter element for a filter for purifying a fluid, wherein the filter element is configured to be arranged exchangeably in a filter housing of the filter, the filter element comprising:
   a filter medium delimiting an element interior,
   wherein the filter medium is configured to allow the fluid to flow therethrough for purification;
   at least one interior opening communicating with the element interior;
   at least one end body arranged at the filter medium such that the at least one end body surrounds the at least one interior opening with respect to a virtual connecting axis of the filter element,
   wherein the at least one end body comprises
      a fastening region surrounding circumferentially the at least one interior opening and surrounding circumferentially the virtual connecting axis;
   at least one insertion adapter configured to connect the filter element to a fluid connector of the filter housing,
   wherein the at least one insertion adapter comprises
      a hollow insertion sleeve configured to be inserted axially with respect to the virtual connecting axis into the fastening region of the at least one end body;
   wherein the fastening region, on a side facing the at least one interior opening, comprises
      a plastic or foamed material that is configured to be initially flexible during manufacture of the filter element and configured to harden later on;
   wherein the hollow insertion sleeve of the at least one insertion adapter comprises one or more circumferentially spaced holding elements each formed as either a radially raised portion or depression arranged at a radially outer circumferential side of the hollow insertion sleeve,
   wherein the circumferential side is radially outwardly positioned with respect to the virtual connecting axis;
   wherein, when the hollow insertion sleeve is inserted axially into the fastening region and fastened therein, the one or more holding elements are arranged in an end position thereof in the fastening region,
   wherein the plastic or foamed material of the fastening region that is initially flexible flows against the one or more holding elements of the hollow insertion sleeve and hardens, thereby forming one or more end body associated holding elements complementary to the one or more holding elements into the fastening region,
   wherein the end body associated one or more holding elements are each either radially raised portions or depressions complimentary to respective one or more holding elements of the hollow insertion sleeve,
   wherein the hardened plastic or foamed material of the fastening region forms a form fit connection with the one or more holding elements of the hollow insertion sleeve, thereby fastening the at least one insertion adapter in the interior opening of the end body of the filter element wherein the at least one insertion adapter comprises at least one locking element formed as a radially projecting step on the radially outer circumferential side of the hollow insertion sleeve and positioned to engage from behind the fastening region of the end body at a side of the fastening region facing the element interior, further locking the at least one insertion adapter into the interior opening of the end body.

2. The filter element according to claim 1, wherein the one or more holding elements of the hollow insertion sleeve comprises or is comprised of at least one raised portion and at least one depression formed on radially outer circumferential side of the hollow insertion sleeve.

3. The filter element according to claim 1, wherein the one or more holding elements is one holding element extending circumferentially continuously about the radially outer circumferential side of the hollow insertion sleeve.

4. The filter element according to claim 3, wherein the one holding element extends circumferentially with interruptions about the radially outer circumferential side of the hollow insertion sleeve.

5. The filter element according to claim 1, wherein the one or more holding elements are a plurality of the holding elements are distributed about the radially outer circumferential side of the hollow insertion sleeve.

6. The filter element according to claim 1, wherein the at least one insertion adapter comprises or carries at least one functional component.

7. The filter element according to claim 1, wherein
the at least one insertion adapter further comprises
at least one adapter-associated positioning element arranged outside of the element interior,
wherein the adapter-associated positioning element is configured to interact with a corresponding housing-associated positioning element arranged at the filter housing of the filter.

8. A filter for purifying a fluid, the filter comprising:
an openable filter housing comprising
at least one fluid inlet for the fluid to be purified and
at least one fluid outlet for purified fluid;
at least one filter element according to claim 1, configured to be exchangeably arranged in the openable filter housing such that the at least one filter element separates the at least one fluid inlet from the at least one fluid outlet.

9. The filter according to claim 8, wherein
the filter housing comprises
at least one fluid drain configured to drain the fluid contained in the filter housing.

10. An insertion adapter for connecting a filter element to a fluid connector in an interior of a filter housing of a filter for purifying a fluid, the insertion adapter comprising:
a hollow insertion sleeve configured to be inserted axially with respect to a virtual connecting axis of the filter element into a fastening region of an end body of the filter element,
wherein the fastening region surrounds circumferentially an interior opening communicating with an element interior of the filter element and surrounds circumferentially the virtual connecting axis;
wherein the fastening region, on a side facing the interior opening, comprises a plastic or foamed material that is configured to be initially flexible during manufacture of the filter element and configured to harden later on;
wherein the hollow insertion sleeve of the insertion adapter comprises circumferentially spaced holding elements each formed as either radially raised portions or depressions, arranged at a radially outer circumferential side of the hollow insertion sleeve,
wherein the radially outer circumferential side is radially outwardly positioned with respect to the virtual connecting axis;
wherein, when the hollow insertion sleeve is inserted axially in the fastening region, the holding element elements is arranged in an end position thereof in the fastening region, wherein the plastic or foamed material of the fastening region that is initially flexible flows behind the holding elements of the hollow insertion sleeve and the material of the fastening region hardens, thereby forming a form fit connection with the holding elements wherein the insertion adapter comprises at least one locking element formed as a radially projecting step on the radially outer circumferential side of the hollow insertion sleeve and positioned to engage from behind the fastening region of the end body at a side of the fastening region facing the element interior, further locking the at least one insertion adapter into the interior opening of the end body.

* * * * *